United States Patent
Weiss et al.

(10) Patent No.: US 7,163,060 B2
(45) Date of Patent: Jan. 16, 2007

(54) DIFUNCTIONAL PHOSPHORUS-BASED GELLING AGENTS AND GELLED NONAQUEOUS TREATMENT FLUIDS AND ASSOCIATED METHODS

(75) Inventors: Richard Weiss, Bethesda, MD (US); Mathew George, Arlington, VA (US); Gary P. Funkhouser, Duncan, OK (US)

(73) Assignees: Halliburton Energy Services, Inc., Duncan, OK (US); Georgetown University, Washington, DC (US)

( * ) Notice: Subject to any disclaimer, the term of this patent is extended or adjusted under 35 U.S.C. 154(b) by 115 days.

(21) Appl. No.: 10/984,523

(22) Filed: Nov. 9, 2004

(65) Prior Publication Data

US 2006/0096756 A1    May 11, 2006

(51) Int. Cl.
*E21B 43/26* (2006.01)

(52) U.S. Cl. .................. 166/308.4; 507/235; 507/237; 507/238

(58) Field of Classification Search ............. 166/308.4; 507/235, 237, 238
See application file for complete search history.

(56) References Cited

U.S. PATENT DOCUMENTS

| | | | | |
|---|---|---|---|---|
| 4,003,393 A | | 1/1977 | Jaggard et al. ............... 137/15 |
| 4,104,173 A | * | 8/1978 | Gay et al. .................... 507/238 |
| 4,200,539 A | * | 4/1980 | Burnham et al. ........... 507/238 |
| 4,200,540 A | * | 4/1980 | Burnham ..................... 507/238 |
| 4,316,810 A | * | 2/1982 | Burnham ..................... 507/238 |
| 4,473,408 A | | 9/1984 | Purinton, Jr. .................. 134/8 |
| 4,480,692 A | * | 11/1984 | Stapp ...................... 166/270.1 |
| 4,622,155 A | | 11/1986 | Harris et al. ............. 252/8.551 |
| 5,271,464 A | | 12/1993 | McCabe ...................... 166/295 |
| 5,846,915 A | | 12/1998 | Smith et al. ................ 507/269 |
| 6,283,215 B1 | | 9/2001 | Kohler et al. ............... 166/302 |
| 6,511,944 B1 | * | 1/2003 | Taylor et al. ............... 507/237 |
| 6,544,934 B1 | * | 4/2003 | Taylor et al. ............... 507/238 |
| 2004/0214728 A1 | * | 10/2004 | Taylor et al. ............... 507/235 |

* cited by examiner

*Primary Examiner*—William Neuder
*Assistant Examiner*—Nicole A Coy
(74) *Attorney, Agent, or Firm*—Robert A. Kent; Baker Botts

(57) ABSTRACT

The present invention provides methods of treating a portion of a subterranean formation, one of which includes: providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and treating the portion of the subterranean formation. Methods of fracturing, providing some degree of sand control, cleaning a portion of a pipeline, treatment fluid compositions, and difunctional gelling agent compositions also are provided.

43 Claims, No Drawings

DIFUNCTIONAL PHOSPHORUS-BASED GELLING AGENTS AND GELLED NONAQUEOUS TREATMENT FLUIDS AND ASSOCIATED METHODS

BACKGROUND

This invention relates to difunctional phosphorus-based gelling agents and gelled nonaqueous treatment fluids, and methods of their use and preparation.

Gelled treatment fluids can be used in a variety of applications requiring a viscous fluid. Some examples include pipeline cleaning applications and subterranean applications, like drilling a well bore in a subterranean formation, stimulating a portion of a subterranean formation, or cleaning a well bore in a subterranean formation, as well as for numerous other purposes. As used herein, the term "treatment fluid" generically refers to a fluid and does not imply any particular action or treatment by the fluid.

Gelled liquid hydrocarbon treatment fluids have been utilized in treating subterranean formations penetrated by well bores, e.g., for stimulation or sand control treatments such as fracturing or gravel packing, respectively. In fracturing treatments, a gelled liquid hydrocarbon fracturing fluid that may comprise particulates, often referred to as proppant, suspended therein is pumped through a well bore into a subterranean formation at a rate and pressure such that one or more fractures are formed or enhanced in a portion of the formation. Proppant particulates may be deposited in the fractures, inter alia, to prevent the formed fractures from closing, thereby maintaining conductive channels through which produced fluids can flow to the well bore. At a desired time, the viscosity of the gelled liquid hydrocarbon fracturing fluid may be reduced, or "broken," and the fluid may be recovered.

Similarly, sand control operations, such as gravel packing, use gelled liquid hydrocarbon treatment fluids, often referred to as gravel pack fluids. Gravel pack fluids usually are used to suspend gravel particulates for delivery to a desired area in a well bore, e.g., near unconsolidated or weakly consolidated formation particulates, to form a gravel pack to enhance sand control. One common type of gravel packing operation involves placing a gravel pack screen in the well bore and packing the annulus between the screen and the well bore with gravel of a specific size designed to prevent the passage of formation sand. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered or produced back from the well bore.

Polyvalent metal salts of orthophosphoric acid esters have been utilized as gelling agents for forming high-viscosity gelled liquid hydrocarbon treatment fluids. Descriptions of such high-viscosity gelled liquid hydrocarbon treatment fluids and methods of their use are set forth, at least in part, in U.S. Pat. No. 4,622,155, issued to Harris et al. on Nov. 11, 1986, and U.S. Pat. No. 5,846,915, issued to Smith et al. on Dec. 8, 1998.

While gelling agents containing polyvalent metal salts of orthophosphoric acid esters have been used successfully in some instances, problems in downstream processes have been encountered. For example, plugging of refinery towers (which often process hydrocarbons produced from formations treated with gelled liquid hydrocarbon fracturing fluids) has caused many expensive, unplanned shutdowns of those towers. The plugging material is high in phosphorus and has been attributed to the phosphoric acid ester gelling agents. Another problem associated with conventional orthophosphoric acid ester gelling agents is that they are not useful to gel fluids that are nonaqueous but not simple hydrocarbons. Such fluids include polar fluids, such as esters, and hydrogen-bonding fluids, such as alcohols. Having the ability to gel such fluids would be desirable, for example, for well bore and pipeline chemical cleanup operations.

SUMMARY

This invention relates to difunctional phosphorus-based gelling agents, and gelled nonaqueous treatment fluids, and methods of their use and preparation.

In one embodiment, the present invention provides a method of treating a portion of a subterranean formation comprising: providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester, and treating the portion of the subterranean formation.

In one embodiment, the present invention provides a method of fracturing a portion of a subterranean formation comprising: providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester, and contacting the portion of the subterranean formation with the gelled nonaqueous treatment fluid under conditions effective to create or enhance at least one fracture in the subterranean formation.

In one embodiment, the present invention provides a method of providing sand control to a portion of a subterranean formation comprising: providing a gelled nonaqueous treatment fluid that comprises gravel particulates, a nonaqueous base fluid, and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and contacting a portion of the subterranean formation with the gelled nonaqueous treatment fluid so as to form a gravel pack near a portion of the subterranean formation.

In one embodiment, the present invention provides a method of preparing gelled nonaqueous treatment fluid comprising the step of: adding a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester to a nonaqueous base fluid; and allowing a gelled nonaqueous treatment fluid to form.

In another embodiment, the present invention provides a method of cleaning a portion of a pipeline comprising: providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and cleaning a portion of the pipeline.

In another embodiment, the present invention provides a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester.

In another embodiment, the present invention provides a difunctional gelling agent that comprises: a polyvalent metal salt of a bisorganophosphinic acid; a polyvalent metal salt of a bisorthophosphoric acid diester; and/or a polyvalent metal salt of a bisorganophosphonic acid monoester.

Other features and advantages of the present invention will be readily apparent to those skilled in the art upon a reading of the description of preferred embodiments which follows.

DESCRIPTION

This invention relates to difunctional phosphorus-based gelling agents, and gelled nonaqueous treatment fluids, and methods of their use and preparation.

The gelled nonaqueous treatment fluids of the present invention are useful in certain surface uses, such as chemically cleaning the interior of a pipeline. The gelled nonaqueous treatment fluids of the present invention also are suitable for use in subterranean treatment operations, such as subterranean stimulation and sand control treatments, such as fracturing and gravel packing that may be carried out in subterranean formations. The compositions and methods of the present invention also may be suitable, for example, to be used as plugging agents, well bore chemical cleaning fluids, or insulating fluids to be used in associated methods.

The gelled nonaqueous treatment fluids of the present invention comprise a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester. The polyvalent salts are made by combining a source of polyvalent metal ions from an activator composition with a bisorganophosphinic acid, a bisorthophosphoric acid diester, or a bisorganophosphonic acid monoester. Suitable activator compositions and bisorganophosphinic acids, bisorthophosphoric acid diesters, and bisorganophosphonic acid monoesters are described below. The term "salt," as used herein and in related applications, refers to polyvalent metal ion salts that can be formed directly from a bisorganophosphinic acid, a bisorthophosphoric acid diester, or a bisorganophosphonic acid monoester.

Suitable activator compositions for forming the polyvalent metal salts of the gelling agents of the present invention comprise a source of polyvalent metal ions. Examples of such suitable ions include, but are not limited to, aluminum ions, gallium ions, lanthanum ions, ruthenium ions, iron ions, or lanthanide rare earth series ions. Preferred polyvalent metal ions have a +3 oxidation state. When ferric iron is utilized, the source of the ions is preferably ferric sulfate or ferric chloride, ferric sulfate being preferred. The ferric iron salt is typically mixed with amines, surfactants, and water to form a liquid activator composition. An example of a commercially available ferric iron activator composition is "EA-3™," sold by Ethox Chemicals, Inc. of Greenville, S.C. When an aluminum compound is utilized, it is preferably selected from aluminum chloride, sodium aluminate, or aluminum isopropoxide. In certain embodiments, the molar ratio of metal to phosphorus could be from about 1:3 to about 2:3. Suitable activator compositions also may comprise amines, surfactants, water, or other suitable components.

Suitable bisorganophosphinic acids have the formula, Formula 1:

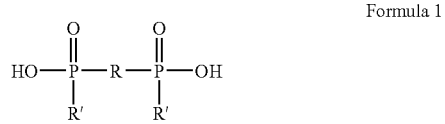

Formula 1 wherein R comprises a hydrocarbon group having from about 4 to about 30 carbon atoms that, for example, may comprise a linear or branched alkyl, alkenyl, aryl, alkylaryl, arylalkyl, cycloalkyl, alkyl ether, aryl ether, or alkyl aryl ether, or a mixture thereof; and R' comprises a hydrocarbon group having from about 1 to about 18 carbon atoms. If R is a relatively small group, then R' may comprise a larger hydrocarbon group similar to that listed above with respect to R (such as linear or branched alkyl, alkenyl, aryl, alkylaryl, arylalkyl, cycloalkyl, alkyl ether, aryl ether, or alkyl aryl ether group, or a mixture thereof) that may have about 1 to about 30 carbon atoms. If R is a relatively small group, then R' can be a bigger group, e.g., to enhance the solubility characteristics of the polyvalent metal salt of the bisorganophosphinic acid. Also, it is preferable if both R and R' are not both branched. In choosing a suitable R and R', one should be mindful that if R and R' are both relatively bulky groups (e.g., if R and R' are both branched groups), then an adequate gelled nonaqueous treatment fluid may not form.

Suitable bisorthophosphoric acid diesters have the formula, Formula 2:

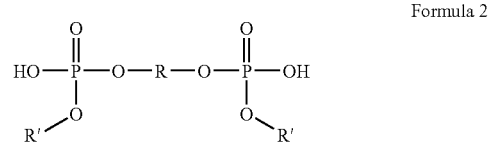

Formula 2 wherein R comprises a hydrocarbon group having from about 4 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof; and R' comprises a hydrocarbon group having from about 1 to about 18 carbon atoms. If R is a relatively small group, then R' may comprise a larger hydrocarbon group similar to that listed above with respect to R (such as linear or branched alkyl, alkenyl, aryl, alkylaryl, arylalkyl, cycloalkyl, alkyl ether, aryl ether, alkyl aryl ether group, or a mixture thereof) that may have about 1 to about 30 carbon atoms. If R is a relatively small group, then R' can be a bigger group, e.g., to enhance the solubility characteristics of the polyvalent metal salt of the bisorthophosphoric acid diester. Also, it is preferable if both R and R' are not both branched. In choosing a suitable R and R', one should be mindful that if R and R' are both relatively bulky groups (e.g., if R and R' are both branched groups), then an adequate gelled nonaqueous treatment fluid may not form.

Suitable bisorganophosphonic acid monoesters have two possible formulas, represented by Formulas 3 and 4:

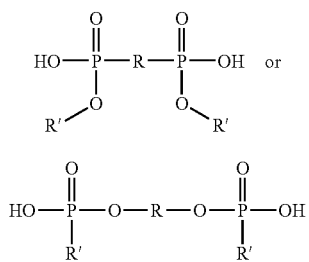

Formula 3

Formula 4 wherein R comprises a hydrocarbon group having from about 4 to about 30 carbon atoms that, for example, may comprise a linear or branched alkyl, alkenyl, aryl, alkylaryl, arylalkyl, cycloalkyl, alkyl ether, aryl ether, or alkyl aryl ether, or a mixture thereof; and R' comprises a hydrocarbon group having from about 1 to about 18 carbon atoms. If R is a relatively small group, then R' may comprise a larger hydrocarbon group similar to that listed above with respect to R (such as linear or branched alkyl, alkenyl, aryl, alkylaryl, arylalkyl, cycloalkyl, alkyl ether, aryl ether, or alkyl aryl ether group, or a mixture thereof) that may have about 1 to about 30 carbon atoms. If R is a relatively small group, then R' can be a bigger group to enhance the solubility characteristics of the polyvalent metal salt of the bisorganophosphonic acid monoester. Also, it is preferable if both R and R' are not both branched. In choosing a suitable R and R', one should be mindful that if R and R' are both relatively bulky groups (e.g., if R and R' are both branched groups), then an adequate gelled nonaqueous treatment fluid may not form. Formula 5 below represents a suitable polyether spacer example of a bisorganophosphonic acid monoester of Formula 4:

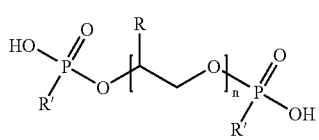

Formula 5 wherein n is from about 1 to about 10; R is either H, an ethyl, or a methyl group; the spacer is polyethylene oxide, polypropylene oxide, or polybutylene oxide; and R' comprises a hydrocarbon group having from about 1 to about 18 carbon atoms. If n is a relatively small number, then R' may comprise a larger hydrocarbon group similar to that listed above with respect to R (such as linear or branched alkyl, alkenyl, aryl, alkylaryl, arylalkyl, cycloalkyl, alkyl ether, aryl ether, or alkyl aryl ether group, or a mixture thereof) that may have about 1 to about 30 carbon atoms.

The polyvalent metal salts of the difunctional gelling agents of the present invention may be formed by any suitable method, which will be known to those ordinarily skilled in the art.

The nonaqueous base fluids utilized to form the gelled nonaqueous treatment fluids of the present invention can comprise any suitable nonaqueous fluid, including, but not limited to, esters, alcohols (such as benzyl alcohol), glycols (such as polyalkylene glycols), dimethyl sulfoxide ("DMSO"), glycol ethers, α-olefins, internal olefins, alkanes, aromatic solvents, cycloalkanes, liquefied petroleum gas, kerosene, diesel oil, gas oil (also known as gas condensate), fuel oil, other petroleum distillates, or certain mixtures of crude oil, or mixtures thereof. Polar fluids are preferred.

If desired, enhancers may be added, inter alia, to provide alkalinity, improve the stability of the polyvalent metal ions in the activator composition, and/or improve the dispersability of the metal ions in the nonaqueous base fluid so as to facilitate the formation of the gelled nonaqueous treatment fluid. Preferred enhancers should provide alkalinity and should facilitate the gelation of the liquid hydrocarbon. Suitable enhancers may be defined by the general formula $C_nH_mO_xN_y$, wherein n is from about 1 to about 50, m is from about 0 to about the number of hydrogens necessary to satisfy the valence requirements of the enhancer compound, x is from about 1 to about 10 (preferably around 2), and y is from about 0 to about 10 (preferably under about 3). Suitable examples would be where the molar ratio of C to N in the enhancer ranges from about 1:1 to about 50:1, and C to O from about 1:1 to about 20:1. Specific examples include ethoxylated amines (like triethanolamines, N,N-dibutyl ethanol amines, and oxyalkylated di-$C_2$-$C_8$ alkyl amines); N,N-di-loweralkyl fatty amines; oxyalkylated fatty amine monoammonium citrate; bis(hydroxyethyl) tallowamine; and ethoxylated dehydroabietylamine. Mixtures of such suitable enhancers also are suitable. One example of a suitable enhancer is a surfactant. Surfactants may be added to facilitate the formation of a gelled nonaqueous treatment fluid. Surfactants may decrease the gelation time of the gelled liquid hydrocarbon because they may allow for a better dispersion of the metal ions in the hydrocarbon fluid. Suitable surfactants that may be used include basic surfactants, especially those that may comprise an amine group. Use of about 0.1% to about 10.0% of a suitable surfactant based on the amount of the gelling agent may be beneficial, inter alia, to help speed formation of the gelled liquid hydrocarbon fluid or to impart desirable rheological characteristics. Some specific examples of suitable surfactants include imidazoline, a fatty acid soap, a fatty acid, dioctyl sulphosuccinate, sodium alkylbenzenesulphonate, fatty acid esters, fatty acid alkanolamides, and amido betaines.

In certain embodiments, the gelled nonaqueous treatment fluids of the present invention may comprise particulate materials like proppant or gravel that can be utilized in, for example, fracturing or gravel packing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application, for which the particulate materials are being used, characteristics of the subterranean formation, and characteristics of the particular gelled nonaqueous treatment fluid being used, as well as other variables. Generally, the sizes of suitable particulates may vary in the range of from about 2 mesh to about 200-mesh, U.S. Sieve Series scale. One of ordinary skill in the art, with the benefit of this disclosure, will be able to choose an appropriate particulate material for a given application.

In addition, in a preferred embodiment, if water is not already contained in a component of a component, e.g., in an activator composition or an enhancer, water may be added in an amount, for example, of about 0.05% or greater by the total treatment fluid volume. The presence of the water, inter alia, may be used beneficially in the present invention, for example, to allow for slowly water-soluble or encapsulated breakers to be dissolved or released that may be used to reduce the viscosity of the gelled nonaqueous treatment fluid when desired. See, for example, Smith et al., U.S. Pat. No. 5,846,915, issued on Dec. 8, 1995, the relevant disclosure of which is incorporated herein by reference.

If a gelled nonaqueous treatment fluid of the present invention is being used in an application wherein it may be desirable to eventually reduce the viscosity of the treatment fluid, for example, to recover it from the subterranean formation at a desired time, then a suitable breaker may be included in or added to the fluid. Any breaker that is able to reduce the viscosity of the gelled nonaqueous treatment fluid when desired is suitable for use in the compositions and methods of the present invention. In certain preferred embodiments, delayed gel breakers that will react with the treatment fluid after a desired delay period may be used. Suitable delayed gel breakers can be materials that are slowly soluble in water, those that are encapsulated, or those that are otherwise designed to slowly solubilize in the fluid. In certain preferred embodiments wherein these types of breakers are used, the breaking of the gel does not take place until the slowly soluble breakers are at least partially dissolved in the water. Examples of such slowly soluble breakers are given in U.S. Pat. No. 5,846,915, issued to Smith et al. on Dec. 8, 1998. Hard-burned magnesium oxide, especially that having a particle size which will pass through a 200-mesh Tyler screen, is a preferred delayed gel breaker. Other breakers, such as alkali metal carbonates, alkali metal bicarbonates, alkali metal acetates, other alkaline earth metal oxides, alkali metal hydroxides, amines, weak acids and the like can be encapsulated with slowly water-soluble or other similar encapsulating materials so as to make them act after a desired delay period. Such materials are well known to those skilled in the art and function to delay the breaking of the gelled liquid hydrocarbon for a required period of time. Examples of water-soluble and other similar encapsulating materials that may be suitable include, but are not limited to, porous solid materials such as precipitated silica, elastomers, polyvinylidene chloride ("PVDC"), nylon, waxes, polyurethanes, polyesters, cross-linked partially hydrolyzed acrylics, and the like. Of the slowly soluble or encapsulated breakers mentioned, hard-burned magnesium oxide, which may be commercially available from Clearwater Inc. of Pittsburgh, Pa., is preferred. If used, the delayed gel breaker may be present in the gelled nonaqueous base fluids of the present invention in an amount in the range of from about 0.01% to about 3% w/v, more preferably in an amount in the range of from about 0.05% to about 1% w/v. "w/v," as used, herein refers to the weight of the component based on the volume of the nonaqueous base fluid that is present in the treatment fluid.

Another type of breaker which can be utilized when the difunctional gelling agent comprises a ferric iron polyvalent metal is a reducing agent that reduces ferric iron to ferrous iron. Of the various oxidation states of iron, ferric iron is capable of forming a viscosifying coordination salt with a difunctional phosphorus-based compound; therefore, the salt may be disassociated by reducing the ferric iron to the ferrous state. The disassociation may cause the gelled nonaqueous treatment fluid to break. Examples of reducing agents which can be utilized include, but are not limited to, stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, and sodium sulfite. Of these, the preferred reducing agents for use at a temperature of about 90° F. are stannous chloride, thioglycolic acid, hydrazine sulfate, sodium diethyldithiocarbamate, and sodium dimethyldithiocarbamate. The most preferred reducing agent is thioglycolic acid, which may be delayed by salt formation or encapsulation. As mentioned above in connection with other breakers that can be used, the reducing agent utilized also can be delayed by encapsulating it with a slowly water-soluble or other similar encapsulating material. If used, the gel breaker is generally present therein in an amount in the range of from about 0.01% to about 3% w/v, more preferably in an amount in the range of from about 0.05% to about 1% w/v.

Gelled nonaqueous treatment fluids of the present invention may be prepared by any suitable method. For instance, a gelled nonaqueous treatment fluid comprising a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be produced at the well site. In an example of such an on-site method, a bisorganophosphinic acid, a bisorthophosphoric acid diester, and/or a bisorganophosphonic acid monoester may be added to a suitable amount of an activator composition that comprises a source of polyvalent metal ions so as to form a difunctional gelling agent comprising a polyvalent metal salt of a bisorganophosphinic acid, a polyvalent metal salt of a bisorthophosphoric acid diester, and/or a polyvalent metal salt of a bisorganophosphonic acid monoester. This may be done in a nonaqueous base fluid so that the resultant difunctional gelling agent may gel the nonaqueous base fluid to form a gelled nonaqueous treatment fluid. In certain embodiments, the molar ratio of metal to phosphorus in the gelled nonaqueous treatment fluid could range from about 1:3 to about 2:3.

A difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be formed off-site and then added to a nonaqueous base fluid at the well site so as to form a gelled nonaqueous treatment fluid. In an example of such a method, a polyvalent metal salt may be prepared by any method that is suitable for forming solid salt particulates (e.g., flakes, pellets, or other particulates) that later can be introduced to a nonaqueous base fluid. The polyvalent metal salt particulates may be transported to the well site where they can be added to a nonaqueous base fluid. In some embodiments of such methods, a nonaqueous base fluid may be pre-gelled or partially gelled using any suitable technique. In one embodiment of such a technique, after the salt particulates are added to the nonaqueous base fluid, no significant increase in the viscosity of the nonaqueous base fluid may be realized until the temperature of the fluid is sufficient to enable the salt particulates to dissolve in the nonaqueous base fluid to eventually increase its viscosity.

Another method of preparing a gelled nonaqueous treatment fluid of the present invention comprises forming an initial nonaqueous gel by adding a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester to a nonaqueous base fluid to form an initial gel. At a desired time, an additional quantity of a difunctional gelling agent that may comprise a polyvalent metal salt of a bisorganophosphinic acid, a polyvalent metal salt of a bisorthophosphoric acid diester, and/or a polyvalent metal salt of a bisorganophosphonic acid monoester may be added to the initial gel, for example, as it is pumped into a well bore that penetrates a subterranean formation, to form a more viscous gel.

Another example of a method for forming the gelled nonaqueous treatment fluids of the present invention involves preparing a nonaqueous gel having a high concentration of a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester. This gel may be highly viscous. This highly viscous gel may be prepared off-site and then delivered to the location of use at a desired time. At the location, the highly viscous gel may be diluted with a nonaqueous base fluid, if desired, for use (for instance, if the gel is to be used in a fracturing or sand control treatment method).

Although certain methodologies of making a gelled nonaqueous treatment fluid of the present invention have been discussed in detail, one should note that the order of addition of each component is not critical, and therefore, other methods are suitable as well. An exemplary method of the present invention of treating a subterranean formation comprises the steps of: providing a gelled nonaqueous treatment fluid comprising a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and treating the subterranean formation with the gelled nonaqueous treatment fluid. Treating the subterranean formation may involve fracturing the subterranean formation, performing a sand control treatment (e.g., gravel packing), providing a plugging agent (e.g., pill), providing a well bore cleanup fluid, or providing an insulating fluid. U.S. Pat. No. 5,271,464, assigned to Halliburton Company, the relevant disclosure of which is incorporated by reference, describes providing a plugging agent with a gel. U.S. Pat. Nos. 4,473,408 and 4,003,393, both assigned to The Dow Chemical Company, the relevant disclosures of which are incorporated by reference, describe the use of organic gels for cleaning the interior of a pipeline. U.S. Pat. No. 6,283,215, assigned to Institut Francais Du Petrole, the relevant disclosure of which is incorporated by reference, describes insulation of tubings placed in a well bore. In certain of such embodiments, a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be present in the treatment fluid in an amount in the range of from about 0.1% to about 10% w/v. The gelled nonaqueous treatment fluids of the present invention also are useful for cleaning the interior of a portion of a pipeline. An exemplary method comprises the steps of: providing a gelled nonaqueous treatment fluid comprising a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and placing the gelled nonaqueous treatment fluid in a portion of a pipeline. In certain of such embodiments, a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be present in the treatment fluid in an amount in the range of from about 0.1% to about 10.0% w/v.

In a fracturing embodiment, a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be added to a nonaqueous base fluid along with an activator composition that comprises a source of polyvalent metal ions to gel the liquid hydrocarbon. In certain embodiments, the difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be added in an amount in the range of from about 0.1% to about 10% w/v. Optionally, a fracturing fluid of the present invention may comprise water and/or a base to achieve a desired gel. A fracturing fluid of the present invention also may comprise proppant. In certain embodiments, the difunctional gelling agent may be present in the treatment fluid in an amount in the range of from about 0.1% to about 5.0% w/v. w/v, more preferably in an amount in the range of from about 0.2% to about 2.5%. In certain embodiments, the gelled nonaqueous treatment fluid may comprise a proppant material. In certain embodiments, the proppant particulates may be present in the fluid in an amount in the range of from about 1 to about 32 pounds of proppant particulates per gallon of liquid hydrocarbon, more preferably in the range of about 1 to about 22 pounds per gallon. As mentioned, if desired, water may be added if not otherwise present in the gelled nonaqueous treatment fluid, so that, e.g., a delayed gel breaker may be utilized. A suitable delayed gel breaker may be present in the treatment fluid in an amount in the range of from about 0.01% to about 3% w/v, more preferably in an amount in the range of from about 0.05% to about 1% w/v. A fracturing method of this invention comprises the following steps: providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and then contacting a portion of a subterranean formation with the gelled nonaqueous treatment fluid under conditions effective to create or enhance a fracture therein.

In a sand control embodiment of this invention, a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester may be added to a nonaqueous base fluid in an amount in the range of from about 0.1% to about 10% w/v with a portion of gravel particulates. Optionally, a gravel pack gelled nonaqueous treatment fluid of the present invention may comprise water and/or a base to achieve a desired gel. A method of the present invention of providing sand control to a subterranean formation comprises the steps of: providing a gelled nonaqueous treatment fluid that comprises gravel particulates, a nonaqueous base fluid, and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and contacting a portion of the subterranean formation with the gelled nonaqueous treatment fluid so as to create a gravel pack neighboring a portion of the subterranean formation. In certain embodiments, the difunctional gelling agent may be present in the gelled liquid hydrocarbon gravel pack fluid in an amount in the range of from about 0.1% to about 5.0% w/v, more preferably in an amount in the range of about 0.2% to about 2.5% w/v. In certain embodiments, the gravel particulates may be present in the fluid in an amount in the range of from about 1 to about 32 pounds of proppant particulates per gallon of liquid hydrocarbon, more preferably in the range of about 1 to about 22 pounds per gallon. As mentioned, if desired, water may be added, if not otherwise present in gelled liquid hydrocarbon gravel pack fluid, so that, e.g., a delayed gel breaker may be utilized. A suitable delayed gel breaker may be present in the gelled liquid hydrocarbon gravel pack fluid in an amount in the range of from about 0.01% to about 10% w/v, more preferably in an amount in the range of from about 0.05% to about 3% w/v.

To facilitate a better understanding of the present invention, the following examples of specific embodiments are given. In no way should the following examples be read to limit, or define, the entire scope of the invention.

EXAMPLES

Example 1

Sample 1 Relating to α,ω-Hexanedi(methyl phosphonic acid): 200 mg of α,ω-hexanedi(methyl phosphonic acid) was dissolved in 10 mL of dimethyl sulfoxide with heating. 200 µL of MO-86 ferric iron activator solution was added with a 1000 µL syringe and mixed.

Sample 2 Relating to α,ω-decanedi(methyl phosphonic acid): 201 mg of α,ω-decanedi(methyl phosphonic acid) was dissolved in 10 mL of dimethyl sulfoxide with heating. 200 µL of MO-86 ferric iron activator solution was added with a 1000 µL syringe and mixed.

Sample 3 Relating to α,ω-decanedi(octadecyl phosphonic acid): 201 mg of α,ω-decanedi(octadecyl phosphonic acid) was dissolved in 10 mL of toluene with heating to 80° C. 200 µL of MO-86 ferric iron activator solution was added with a 1000 µL syringe and mixed.

Measurements for samples 1, 2, and 3 were made with a Haake RheoStress RS150 stress-controlled rheometer fitted with a 60 mm diameter, 2° cone, and plate. The sample was loaded onto the rheometer at 35° C. and then cooled to the test temperature of 25° C. A constant frequency (1 Hz) oscillatory stress sweep from 0.05 to 100 Pa was performed to obtain the storage modulus and loss modulus. The results are shown in Table 1.

TABLE 1

Rheological Characterization of Difunctional Gelling Agents.

| Polyvalent Metal Salt | Nonaqueous Base Fluid | Stress, Pa | G', Pa | G' Pa |
|---|---|---|---|---|
| Sample 1 - α,ω-Hexanedi(methyl phosphonic acid) | DMSO | 0.10 | 105 | 11 |
| Sample 1 - α,ω-Hexanedi(methyl phosphonic acid) | DMSO | 0.53 | 107 | 10 |
| Sample 1 - α,ω-Hexanedi(methyl phosphonic acid) | DMSO | 0.99 | 105 | 12 |
| Sample 1 - α,ω-Hexanedi(methyl phosphonic acid) | DMSO | 5.37 | 106 | 12 |
| Sample 1 - α,ω-Hexanedi(methyl phosphonic acid) | DMSO | 13.50 | 95 | 20 |
| Sample 2 - α,ω-Decanedi(methyl phosphonic acid) | DMSO | 0.10 | 259 | 44 |
| Sample 2 - α,ω-Decanedi(methyl phosphonic acid) | DMSO | 0.53 | 251 | 25 |
| Sample 2 - α,ω-Decanedi(methyl phosphonic acid) | DMSO | 0.99 | 250 | 34 |
| Sample 2 - α,ω-Decanedi(methyl phosphonic acid) | DMSO | 5.37 | 256 | 26 |
| Sample 2 - α,ω-Decanedi(methyl phosphonic acid) | DMSO | 13.50 | 251 | 26 |
| Sample 3 - α,ω-Decanedi(octadecyl phosphonic acid) | Toluene | 0.10 | 537 | 409 |
| Sample 3 - α,ω-Decanedi(octadecyl phosphonic acid) | Toluene | 0.53 | 1503 | 50 |
| Sample 3 - α,ω-Decanedi(octadecyl phosphonic acid) | Toluene | 0.99 | 1468 | 58 |
| Sample 3 - α,ω-Decanedi(octadecyl phosphonic acid) | Toluene | 5.37 | 1551 | 124 |
| Sample 3 - α,ω-Decanedi(octadecyl phosphonic acid) | Toluene | 13.50 | 1419 | 160 |

Synthesis examples: Synthesis of 1,10-decanebis(phosphonic acid, dimethyl ester). To a suspension of NaH (1.45 g, 60% dispersion, 36 mmol) in THF (20 mL, dry) was slowly added dimethyl phosphite (4 g, 36 mmol) in THF (20 mL, dry). The contents were stirred for 1 hr at room temperature under a nitrogen atmosphere, 1,10-dibromodecane (5.0 g, 17 mmol) in THF (20 mL, dry) was added over a period of 30 min, and stirring was continued for an additional 2 h. A white precipitate separated and the mixture was then refluxed for 2 h. The solid formed was removed by filtration and the filtrate was concentrated, leaving an oil. This was then dissolved in hexane (100 mL) and the product solidified upon cooling the hexane solution. Cold filtration of this solution gave 4.98 g (82%) of the tetraester (90% pure by P NMR), which was used as such for the next step. $^1$H NMR (CDCl$_3$) δ: 3.72–3.75 (d, J=10.8 Hz, 12H, OCH$_3$), 1.27–1.79 (m, 20H, CH$_2$). $^{31}$P NMR (CDCl$_3$) δ: 36.26 (2P; bis adduct), 34.28 (0.18 P; impurity).

Synthesis of 1,10-decanebis(phosphonic acid, monomethyl ester). 1,10-decanebis(phosphonic acid, dimethyl ester) (2.0 g, 5.58 mmol) was dissolved in 2-butanone (50 mL). To this solution was added NaI (1.67 g, 11.2 mmol). The mixture was refluxed for 12 h and the precipitate that formed was separated by filtration and washed with acetone to yield 1.88 g (87%) of the sodium salt as a white solid. It was then dissolved in methanol (50 mL), cooled in an ice-bath, and dry HCl gas (produced by reacting ammonium chloride with conc. H$_2$SO$_4$ and passing the gas through conc. H$_2$SO$_4$) was bubbled through for 15 min. The mixture was then purged with a stream of nitrogen to remove HCl, an equal volume of ethyl acetate was added, and the precipitated NaCl was separated from the mixture by filtration. The product, mp 112.4° C. to 113.4° C., separated as white crystals (1.70 g, 96%) when the solution was refrigerated. A small amount (4% by $^{31}$P NMR) of impurity was not removed by recrystallization. IR (neat): 3385 (OH), 2917, 2848 (CH), 1182 (P=O) cm$^{-1}$. $^1$H NMR (CDCl$_3$) δ: 7.80 (br s, 2H, OH), 3.70–3.74 (d, J=11.1 Hz, 6H, OCH$_3$), 1.30–1.82 (m, 20H, CH$_2$). $^{31}$P NMR (D$_2$O) δ: 38.26 (2P; ester), 37.00 (0.08P; impurity). The impurity peak was removed by repeated recrystallization from a 1:1 mixture of hexane and ethyl acetate.

Thus, the present invention is well-adapted to carry out the objects and attain the benefits and advantages mentioned as well as those which are inherent therein. While numerous changes to the methods and compositions can be made by those skilled in the art, such changes are encompassed within the spirit of this invention as defined by the appended claims.

What is claimed is:

1. A method of treating a portion of a subterranean formation comprising:
providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and
treating the portion of the subterranean formation.

2. The method of claim 1 wherein the nonaqueous base fluid comprises at least one of the following: an ester, an alcohol, a glycol, dimethyl sulfoxide, a glycol ether, an α-olefin, an internal olefin, an alkane, an aromatic solvent, a cycloalkane, liquefied petroleum gas, kerosene, diesel oil, gas oil, fuel oil, a petroleum distillate; or a crude oil mixture, or a mixture thereof.

3. The method of claim 1 wherein the polyvalent metal salt of a bisorganophosphinic acid is formed from a reaction comprising an activator composition that comprises a source of polyvalent metal ions and a bisorganophosphinic acid, the bisorganophosphinic acid having the formula:

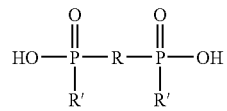

wherein R or R' comprises a hydrocarbon group having about 1 to about 30 carbon atoms; R or R' comprises a hydrocarbon group having from about 1 to about 18 carbon atoms; and R and R' are not both branched.

4. The method of claim 3 wherein the polyvalent metal ions comprise at least one of the following: aluminum ions, gallium ions, lanthanum ions, ruthenium ions, iron ions, or lanthanide rare earth series ions.

5. The method of claim 3 wherein the polyvalent metal ions comprise ions having a +3 oxidation state.

6. The method of claim 3 wherein the activator composition comprises a ferric iron salt, aluminum chloride, sodium aluminate, or aluminum isopropoxide.

7. The method of claim 1 wherein the polyvalent metal salt of a bisorthophosphoric acid diester is formed from a reaction comprising an activator composition that comprises a source of polyvalent metal ions and a bisorthophosphoric acid diester, the bisorthophosphoric acid diester having the formula:

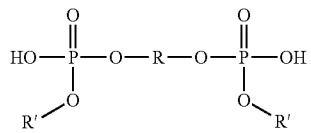

wherein R or R' comprises a hydrocarbon group having about 1 to about 30 carbon atoms; R or R' comprises a hydrocarbon group having from about 1 to about 18 carbon atoms; and R and R' are not both branched.

8. The method of claim 7 wherein the polyvalent metal ions comprise at least one of the following: aluminum ions, gallium ions, lanthanum ions, ruthenium ions, iron ions, or lanthanide rare earth series ions.

9. The method of claim 7 wherein the polyvalent metal ions comprise ions having a +3 oxidation state.

10. The method of claim 7 wherein the activator composition comprises a ferric iron salt, aluminum chloride, sodium aluminate, or aluminum isopropoxide.

11. The method of claim 1 wherein the polyvalent metal salt of a bisorganophosphonic acid monoester is formed from a reaction comprising an activator composition that comprises a source of polyvalent metal ions and a bisorganophosphonic acid monoester, the bisorganophosphonic acid monoester having one of these formulas:

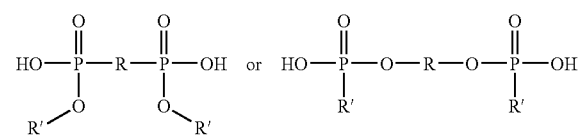

wherein R or R' comprises a hydrocarbon group having from about 1 to about 30 carbon atoms; R or R' comprises a hydrocarbon group having from about 1 to about 18 carbon atoms; and R and R' are not both branched.

12. The method of claim 11 wherein the polyvalent metal ions comprise at least one of the following: aluminum ions, gallium ions, lanthanum ions, ruthenium ions, iron ions, or lanthanide rare earth series ions.

13. The method of claim 11 wherein the polyvalent metal ions comprise ions having a +3 oxidation state.

14. The method of claim 11 wherein the activator composition comprises a ferric iron salt, aluminum chloride, sodium aluminate, or aluminum isopropoxide.

15. The method of claim 1 wherein the gelled nonaqueous treatment fluid comprises a surfactant.

16. The method of claim 15 wherein the surfactant comprises imidazoline, a fatty acid soap, a fatty acid, dioctyl sulphosuccinate, sodium alkylbenzenesulphonate, a fatty acid ester, a fatty acid alkanolamide, or an amido betaine.

17. The method of claim 15 wherein the surfactant is present in the gelled nonaqueous treatment fluid in an amount in the range of from about 0.1% to about 10% based on the difunctional gelling agent.

18. The method of claim 1 wherein the gelled nonaqueous treatment fluid comprises an enhancer.

19. The method of claim 18 wherein the enhancer provides at least some alkalinity to the gelled nonaqueous treatment fluid.

20. The method of claim 18 wherein the enhancer has the general formula $C_nH_mO_xN_y$, wherein n is from about 1 to about 50, m is from about 0 to about the number necessary to satisfy the valence of the enhancer, x is from about 1 to about 10, and y is from about 0 to about 10.

21. The method of claim 18 wherein the enhancer comprises an ethoxylated amine, triethanolamine, N,N-dibutyl ethanol amine, an oxyalkylated di-$C_2$-$C_8$-alkyl amine, N,N-di-loweralkyl fatty amine, an oxyalkylated fatty amine, monoammonium citrate, bis(hydroxyethyl) tallowamine, or ethoxylated dehydroabietylamine, or a mixture thereof.

22. The method of claim 1 wherein treating the subterranean formation involves fracturing a portion of the subterranean formation.

23. The method of claim 1 wherein treating the subterranean formation involves providing sand control to at least a portion of the subterranean formation.

24. The method of claim 1 wherein the gelled nonaqueous treatment fluid further comprises a breaker, the breaker being present in an amount sufficient to reduce the viscosity of the gelled nonaqueous treatment fluid at a desired time.

25. The method of claim 24 wherein the breaker comprises a delayed gel breaker.

26. The method of claim 25 wherein the delayed gel breaker comprises an encapsulated delayed gel breaker.

27. The method of claim 25 wherein the delayed gel breaker is present in an amount in the range of from about 0.01% to about 3% w/v.

28. The method of claim 24 wherein the breaker comprises at least one of the following: hard burned magnesium oxide, an alkali metal carbonate, alkali metal bicarbonate, alkali metal acetate, an alkaline earth metal oxide, an alkali metal hydroxide, an amine, or a weak acid.

29. The method of claim 24 wherein the breaker comprises a reducing agent that is capable of reducing ferric iron to ferrous iron.

30. The method of claim 29 wherein the reducing agent comprises stannous chloride, thioglycolic acid, hydrazine sulfate, sodium diethyldithiocarbamate, sodium dimethyldithiocarbamate, sodium hypophosphite, potassium iodide, hydroxylamine hydrochloride, 2-mercaptoethanol, ascorbic acid, sodium thiosulfate, sodium dithionite, or sodium sulfite.

31. The method of claim 24 wherein the breaker is present in an amount of 0.01% to about 3% of the volume of the treatment fluid.

32. The method of claim 1 wherein treating the subterranean formation involves chemically cleaning a portion of the subterranean formation.

33. The method of claim 1 wherein treating the subterranean formation involves insulating a portion of the subterranean formation, a portion of a well bore penetrating the subterranean formation, or a tubing placed in a well bore penetrating the subterranean formation.

34. The method of claim 1 further comprising the step of preparing the gelled nonaqueous treatment fluid at the location of a well bore penetrating the subterranean formation.

35. The method of claim 1 further comprising the steps of preparing the gelled nonaqueous treatment fluid at a location away from the subterranean formation and transporting the gelled nonaqueous treatment fluid to the subterranean formation.

36. The method of claim 1 wherein the polyvalent metal salt of a bisorganophosphonic acid monoester is formed from a reaction comprising an activator composition that comprises a source of polyvalent metal ions and a bisorganophosphonic acid monoester, the bisorganophosphonic acid monoester having this formula:

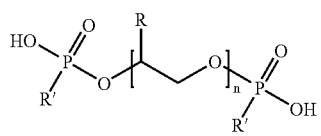

wherein n is from about 1 to about 10; R is either H, an ethyl, or a methyl group; the spacer is polyethylene oxide, polypropylene oxide, or polybutylene oxide; and R' comprises a hydrocarbon group having from about 1 to about 18 carbon atoms.

37. The method of claim 36 wherein the polyvalent metal ions comprise at least one of the following: aluminum ions, gallium ions, lanthanum ions, ruthenium ions, iron ions, or lanthanide rare earth series ions.

38. A method of fracturing a portion of a subterranean formation comprising:

providing a gelled nonaqueous treatment fluid that comprises a nonaqueous base fluid and a difunctional gelling agent that comprises a polyvalent metal salt of a bisorganophosphinic acid, a polyvalent metal salt of a bisorthophosphoric acid diester, and/or a polyvalent metal salt of a bisorganophosphonic acid monoester; and contacting the portion of the subterranean formation with the gelled nonaqueous treatment fluid under conditions effective to create or enhance at least one fracture in the subterranean formation.

39. The method of claim 38 wherein the nonaqueous base fluid comprises at least one of the following: an ester, an alcohol, a glycol, dimethyl sulfoxide, a glycol ether, an α-olefin, an internal olefin, an alkane, an aromatic solvent, a cycloalkane, liquefied petroleum gas, kerosene, diesel oil, gas oil, fuel oil, a petroleum distillate, or a crude oil mixture, or a mixture thereof.

40. The method of claim 38 wherein the polyvalent metal salt of a bisorganophosphinic acid is formed from a reaction comprising an activator composition that comprises a source of polyvalent metal ions and a bisorganophosphinic acid, the bisorganophosphinic acid having the formula:

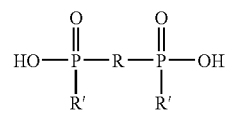

wherein R or R' comprises a hydrocarbon group having about 1 to about 30 carbon atoms; R or R' comprises a hydrocarbon group having from about 1 to about 18 carbon atoms; and R and R' are not both branched.

41. The method of claim 38 wherein the polyvalent metal salt of a bisorthophosphoric acid diester is formed from a reaction comprising an activator composition that comprises a source of polyvalent metal ions and a bisorthophosphoric acid diester, the bisorthophosphoric acid diester having the formula:

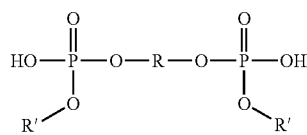

wherein R or R' comprises a hydrocarbon group having about 1 to about 30 carbon atoms; R or R' comprises a hydrocarbon group having from about 1 to about 18 carbon atoms; and R and R' are not both branched.

42. The method of claim 38 wherein the polyvalent metal salt of a bisorganophosphonic acid monoester is formed from a reaction comprising an activator composition that comprises a source of polyvalent metal ions and a bisorganophosphonic acid monoester, the bisorganophosphonic acid monoester having one of these formulas:

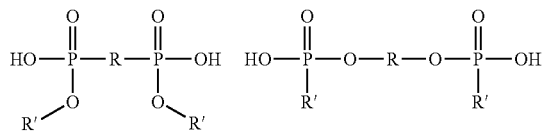

wherein R or R' comprises a hydrocarbon group having from about 1 to about 30 carbon atoms;

R or R' comprises a hydrocarbon group having from about 1 to about 18 carbon atoms; and R and R' are not both branched.

43. The method of claim 38 wherein the polyvalent metal salt of a bisorganophosphonic acid monoester is formed from a reaction comprising an activator composition that comprises a source of polyvalent metal ions and a bisorganophosphonic acid monoester, the bisorganophosphonic acid monoester having this formula:

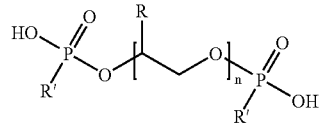

wherein n is from about 1 to about 10; R is either H, an ethyl, or a methyl group; the spacer is polyethylene oxide, polypropylene oxide, or polybutylene oxide; and R' comprises a hydrocarbon group having from about 1 to about 18 carbon atoms.

* * * * *